United States Patent
Furneaux

(10) Patent No.: US 8,409,676 B2
(45) Date of Patent: Apr. 2, 2013

(54) COMPOSTABLE PACKAGING MATERIALS AND METHODS

(75) Inventor: Geoffrey Furneaux, Hereford (GB)

(73) Assignee: Mars, Inc., McLean, VA (US)

( * ) Notice: Subject to any disclaimer, the term of this patent is extended or adjusted under 35 U.S.C. 154(b) by 314 days.

(21) Appl. No.: 10/572,727

(22) PCT Filed: Sep. 29, 2004

(86) PCT No.: PCT/GB2004/004144
§ 371 (c)(1), (2), (4) Date: Mar. 23, 2007

(87) PCT Pub. No.: WO2005/030482
PCT Pub. Date: Apr. 7, 2005

(65) Prior Publication Data
US 2007/0259139 A1 Nov. 8, 2007

(30) Foreign Application Priority Data
Sep. 29, 2003 (GB) .................................. 0322760.0

(51) Int. Cl.
*B32B 1/02* (2006.01)
*B32B 23/00* (2006.01)

(52) U.S. Cl. ...................... 428/34.2; 428/34.1; 428/34.3; 428/35.7; 428/35.9; 428/36.9; 156/60

(58) Field of Classification Search ............... 428/34.1, 428/34.2, 35.9, 36.9, 35.7, 34.3; 156/60
See application file for complete search history.

(56) References Cited

U.S. PATENT DOCUMENTS

| | | | | |
|---|---|---|---|---|
| 4,409,252 A | * | 10/1983 | Buschkens et al. | ............ 426/396 |
| 5,854,304 A | * | 12/1998 | Garcia et al. | ................. 523/124 |
| 6,080,478 A | | 6/2000 | Karhuketo | |
| 6,153,276 A | * | 11/2000 | Oya et al. | ...................... 428/35.2 |
| 6,183,814 B1 | | 2/2001 | Nangeroni et al. | |
| 6,262,174 B1 | * | 7/2001 | Cooper et al. | ................... 525/88 |
| 6,312,823 B1 | | 11/2001 | El-Afandi et al. | |
| 6,333,087 B1 | * | 12/2001 | Jerdee et al. | ................. 428/35.9 |
| 6,677,048 B2 | | 1/2004 | Karhuketo et al. | |
| 6,893,672 B2 | * | 5/2005 | Ingraham | ...................... 426/107 |

(Continued)

FOREIGN PATENT DOCUMENTS

EP 0 179 641 4/1986
EP 0 624 615 A2 11/1994

(Continued)

OTHER PUBLICATIONS

International Search Report issued Dec. 22, 2004 (published Apr. 7, 2005) during the prosecution of International Application No. PCT/GB2004/00004144.

(Continued)

*Primary Examiner* — Marc Patterson
(74) *Attorney, Agent, or Firm* — Fulbright & Jaworski L.L.P.

(57) ABSTRACT

A compostable sheet material comprising a compostable substrate layer, a first compostable and sealable layer on a first side of the substrate layer, and a second compostable and sealable layer overlying said first sealable layer, wherein the material of the second sealable layer has a lower heat-sealing initiation temperature than the material of the first sealable layer. Also provided are environmentally friendly packages comprising the inventive sheet material, and methods of making such packages.

5 Claims, 2 Drawing Sheets

U.S. PATENT DOCUMENTS

| | | | |
|---|---|---|---|
| 6,957,915 B2 * | 10/2005 | Tankersley | 383/109 |
| 7,707,803 B2 | 5/2010 | Mori et al. | |
| 2002/0176974 A1 * | 11/2002 | Hanyu et al. | 428/213 |

FOREIGN PATENT DOCUMENTS

| | | |
|---|---|---|
| EP | 0 514 137 B1 | 3/1998 |
| EP | 1369227 A1 | 12/2003 |
| GB | 2 121 762 A | 1/1984 |
| JP | 7310236 A | 11/1995 |
| WO | 9711845 A1 | 4/1997 |
| WO | WO-99/05036 | 1/1999 |
| WO | WO-00/01530 | 1/2000 |
| WO | 2000/05068 A1 | 2/2000 |
| WO | 0202322 A1 | 1/2002 |
| WO | WO-02/100921 A1 | 12/2002 |

OTHER PUBLICATIONS

Written Opinion issued Dec. 22, 2004 (published Mar. 29, 2006) during the prosecution of International Application No. PCT/GB2004/00004144.

International Preliminary Report on Patentability issued Apr. 3, 2006 (published Apr. 3, 2006) during the prosecution of International Application No. PCT/GB2004/00004144.

* cited by examiner

COMPOSTABLE PACKAGING MATERIALS AND METHODS

CROSS-REFERENCE TO RELATED APPLICATIONS

This application is a national stage filing of PCT/GB2004/004144 filed Sep. 29, 2004 claiming priority to GB 0322760.0 filed Sep. 29, 2003.

TECHNICAL FIELD

The present invention relates to compostable sheet materials for the manufacture of environmentally friendly packaging. The invention also relates to methods of making packages from such sheet materials, and to packages obtainable thereby.

BACKGROUND OF THE INVENTION

GB-A-2121762 describes sealed beverage packages containing a product for preparing a beverage in admixture with water, the package comprising a sachet of flexible film material and an integral nozzle for water injection into the package. The beverage escapes from the package through an outlet made by the user cutting open the bottom of the package, or the package may comprise means for enabling a user to open the base of the sachet easily, for example peelable tabs, edge nicks, tear strings or tear strips. However, in each case the intervention of a user is needed to open the bottom of the sachet.

EP-A-0179641 describes a related beverage brewing system, in which the package is a sachet of flexible film material with an integral nozzle for water injection. The bottom edge of the beverage sachet is sealed by bonding together two sheets of flexible film material with a pressure-sensitive adhesive. When the interior of the sachet is pressurised by injection of water to brew beverage, the resulting pressure in the sachet separates the pressure-sensitive adhesive, thereby allowing the beverage to flow out of the bottom of the sachet. This beverage brewing system has enjoyed great commercial success. However, the need to apply a pressure sensitive adhesive adds to the complexity of manufacturing these sachets. Furthermore, the sachets described in this reference are not biodegradable or compostable.

Polylactic acid and lactic acid copolymers are thermoplastic and biodegradable and compostable. When the polymers are placed in soil or sea water, the polymers start to decompose. In a compost, these materials biodegrade rapidly. The degradation products of these polymers are lactic acid, carbon dioxide and water, all of which are nontoxic.

Polymers of lactic acid are usually prepared from a cyclic dimer of lactic acid which is called lactide. In a typical copolymerization of lactic acid, lactide and glycolide, (a dimer of glycolic acid) are mixed, and ring-opening polymerization is carried out. In the alternative, the polymers may be prepared directly by condensation of lactic acid or a mixture of lactic acid and glycolic acid, but in these direct condensations a high molecular weight polymer cannot be obtained even if the reaction is carried out for a long time. On the other hand, the ring-opening polymerization of lactide or of a mixture of lactide and glycolide can provide a high molecular weight straight-chain polyester. Suitable polymerisation processes are described in EP-A-0624615 and WO-A-02100921.

Lactic acid polymers and copolymers are thermoplastic, but heat sealing of films of such polymers is difficult because of heat distortion and shrinkage of the films, and because the films tend to stick to the sealing jaws of the heat sealing apparatus.

EP-A-0514137 describes degradable laminates comprising a surface layer of a polylactide polymer or copolymer, wherein the surface layer is laminated to a layer of regenerated cellulose, film, paper, leather or cloth.

US-B-6183814 describes paper substrates coated with a layer of compostable polylactide. The resulting coated papers are suitable for making e.g. compostable paper cups. The paper may be sequentially coated with two layers of different polylactides onto the paper substrate.

U.S. Pat. No. 6,153,276 describes heat-sealable laminates of PLA. The laminates comprise a substrate layer of crystalline PLA having a high melting point, and a sealing layer of amorphous PLA having a lower melting point. There is no disclosure of applying such laminates to a printable substrate.

BRIEF SUMMARY OF THE INVENTION

In a first aspect, the present invention provides a compostable sheet material comprising a compostable substrate layer, a first compostable and sealable layer on a first side of the substrate layer, and a second compostable and sealable layer overlying said first sealable layer, wherein the material of the second sealable layer has a lower heat-sealing initiation temperature than the material of the first sealable layer.

The term "compostable" signifies that the material is substantially broken down within a few months, preferably within a few weeks, when it is composted. Typically, the sheet material is at least about 90% composted within six months, as determined by the method of ISO14855, as in EN13432. Typically, all components of the sheet material are compostable, but in some embodiments there may be a non-compostable component, additive or layers as allowed in EN13432.

The term "heat-sealing initiation temperature" refers to the minimum sealing temperature at which the peel strength of a seal measured in accordance with ASTM F88-00 achieves a value of at least 2N.

The Substrate Layers

The substrate layer may be thermoplastic or non-thermoplastic, but in any case it usually has a melting temperature higher than those of the sealant layers in order to provide support to the sealant layers during thermic sealing. Typically, the substrate layer comprises a printing substrate material. Suitable substrate materials include paper and cellophane. Exemplary papers for use in the invention include art paper (coated paper), kraft paper, rolled sheet, rice paper, cross paper and paper-board. The paper may contain regenerated pulp.

The substrate layer may itself be a laminate, for example a laminate of a printing substrate layer, optionally an oxygen barrier layer, optionally a protective outer layer, and optionally other layers.

Suitable materials for inclusion as an oxygen barrier layer in the substrate include polyvinyl alcohol (PVOH), ethylene vinyl alcohol (EVOH), starch and starch derivatives. Yet other suitable oxygen barrier layers comprise inorganic (e.g. silicon) oxides, inorganic nitrides, or inorganic oxide nitrides. These materials have the benefit of being compostable.

The Sealant Layers

A characterizing feature of the present invention is the provision of at least two different compostable sealing layers on the support. This allows the sealing properties of the sheet material to be controlled to a higher degree than before, and in particular allows two or more sealing strengths to be achieved with a single sheet. For example, the material of the second heat-sealable layer may have a lower sealing initiation energy than the material of the first heat-sealable layer. In such embodiments, it is possible to bond the sheet with a light sealing strength, such that just sufficient energy is used to bond the second sealable layers only. It is also possible to bond with a high sealing strength by applying sufficient energy and/or pressure to bond both sealant layers together. In any case, the chemical and/or stereochemical composition of the first and second sealing layers are different so as to provide different sealing properties to the two layers.

A further advantage of multiple sealing layers is that the seal strengths may be independently controlled by selection of the polymer composition and processing. It may be seen by one skilled in the art that such multiple layers may be achieved by co-extrusion of a single film, or by lamination of individual layers.

Thermoplastic compostable polymers that could be used for the sealable layers include polymers and copolymers of lactic acid, polyhydroxybutyrates, polyvinyl alcohols (PVOH), ethylene vinyl alcohols (EVOH), and mixtures thereof.

Suitably, at least one of the first and second sealable layers comprises, or consists essentially of, polylactic acid or a copolymer of lactic acid and a hydroxycarboxylic acid. Such polymers can be strongly adhered to a substrate such as paper, by adhering or applying the polymer to the substrate in the form of a film or a solution. The resulting laminates are excellent in moisture-proofness, and have high mechanical strength. In certain embodiments, both of the first and second sealable layers comprise, or consists essentially of, polylactic acid or a copolymer of lactic acid and hydroxycarboxylic acid. In such embodiments, the different sealing properties of the first and second sealable layers are achieved by using polymers of different molecular structures and/or by the use of different plasticisers in the different layers, and/or by using different proportions of stereisomers of one of the monomers to form the polymer. For example, varying the D/L ratio of the lactic acid used to form polylactic polymers and copolymers has a significant effect on sealing properties of the polymers. The raw materials of the polymer are lactic acid, lactide which is a cyclic dimer of lactic acid, and other hydroxycarboxylic acids. Other hydroxycarboxylic acids include, for example, glycolic acid, 3-hydroxybutyric acid, 4-hydroxybutyric acid, 4-hydroxyvaleric acid, 5-hydroxyvaleric acid and 6-hydroxycaproic acid.

These polymers can be directly prepared through dehydrating polycondensation from lactic acid or other hydroxycarboxylic acid or through ring-opening polymerization from lactide, glycolide, epsilon-caprolactone or a mixture of these compounds. A copolymer prepared by transesterification of polylactic acid with other hydroxycarboxylic acid polymers can also be used. The monomers may be present in any stereoisomeric form, and/or as a mixture of different stereoisomers, and the sealing properties of the polymers will be influenced by the stereochemical composition. For example, the lactic acid unit which constituted these polymers can be L-lactic acid, D-lactic acid or a mixture of these lactic acids. Poly-L-lactic acid (PLLA) is more crystalline and has a higher heat sealing temperature than polymers of mixed D/L lactic acids.

The preferred polymers for use in the sealing layers of the sheet materials of the present invention suitably have an average molecular weight of from 10,000 to 1,000,000, and a polymerization degree of from 150 to 20,000. In some embodiments, the molecular weight of the polymer in the first heat sealing layer is higher than that of the polymer in the second heat sealing layer.

Plasticizers can be added in order to provide flexibility or to adjust the heat sealing properties of the polylactide layers. Plasticizers which can be used include, for example, diethyl phthalate, dioctyl phthalate, dicyclohexyl phthalate and other phthalic acid esters; di-isobutyl adipate, di-n-octyl adipate, di-n-butyl sebacate, di-2-ethylhexyl sebacate, di-2-ethylhexyl azelate and other aliphatic dicarboxylic acid esters; diphenyl 2-ethlhexyl phosphate, diphenyl octyl phosphate and other phosphoric acid esters; tributyl acetylcitrate, tri-2-ethylhexyl acetylcitrate, tributyl citrate and other hydroxypolycarboxylic acid esters; methyl acetylricinoleate, amyl stearate and other aliphatic carboxylic acid esters; glycerol triacetate, triethylene glycol dicaprylate and other polyhydric alcohol esters; epoxylated soybean oil, octyl epoxystearate and other epoxy-base plasticizers; and polypropylene glycol adipate, polypropylene glycol sebacate and other polyester base plasticizers. In food packaging applications, the plasticiser should be one of those approved for use in food packaging.

The amount of the plasticizer for use is usually from 5 to 50% by weight, preferably from 5 to 20% by weight for the polymer composition. The plasticizer may be added to the polymer as a solution in a solvent, or in molten state.

The thickness of the sealant layers may vary in accordance with this invention. In one embodiment of this invention, for example, the thickness of each of the first and second sealant layers is independently from about 1 to about 40 micrometers, preferably from about 2 to about 20 micrometers. The total basis weight of the sealing layers may for example be from about 10 to about 100 $g/m^2$, suitably from about 20 to about 50 $g/m^2$. The total thickness of the multilayer sealant film is typically from about 10 to about 100 micrometers, for example from about 20 to about 60 micrometers.

A suitable method of manufacture of a multilayer sealant film is by using a blown film coextrusion process, although other methods of manufacture of the film may be used. The multilayer sealant film may then be laminated to the substrate sheet.

Lamination can be carried out by various method such as thermic bonding, solution coating, hot-melt coating, extrusion lamination, and adhesive lamination. Suitable adhesives include compostable adhesives such as polylactides, gelatin, casein and starch. The surface of the substrate can also be precoated prior to lamination, for example with an oxygen barrier layer or with an organic titanium compound, organic silane compound or polyethyleneimine. In some cases, the substrate paper can be previously impregnated with lactic acid, other hydroxycarboxylic acid, lactide, glycolide or epsilon-caprolactone.

In a second aspect, the present invention provides an environmentally friendly package comprising a compostable sheet material, said sheet material comprising a compostable substrate layer, a first compostable and sealable layer on a first side of the substrate layer, and a second compostable and sealable layer overlying said first sealable layer, wherein the package comprises first and second regions of sealing between sheets of compostable material, said first region having a relatively high sealing strength, and said second region having a relatively low sealing strength.

It will be appreciated that references to sealable layers in general usually refers to heat-sealable layers as hereinbefore described, i.e. thermoplastic layers. However, the present invention contemplates not only thermic (heat) sealing but also sealing by ultrasonic energy, induction or other suitable means, with or without the application of pressure.

In the package, normally at least one region of the sheet material is bonded to a second region of the package. In certain embodiments a first region of the sheet material is sealed to a second region of sheet material according to the present invention. The second region may be on the same sheet folded over, or it may be on a separate sheet of the material, but in any case the bonding will normally be thermic bonding of the respective sealing layers in face-to-face relationship, or it may be bonding by ultrasound or induction, with or without the application of pressure.

As already discussed, it is a particular advantage of the sheet materials according to the present invention that the multiple sealing layer permits the sealing strength to be controlled, depending on whether sealing is made through just the second sealing layer, or whether it is made through both sealing layers. Accordingly, in the package according to the present invention, the sheet material may have both a first region of sealing having a relatively high heat sealing strength, and a second region of sealing having a relatively low heat sealing strength. The low sealing strength region may be convenient to assist opening of the package by breaking only the weaker seal.

Suitably, the seal strength (peel strength) of the region of sealing having a relatively low heat sealing strength as measured by ASTM F88-00 is in the range of from about 2N to about 30N, preferably from 5N to about 20N. This seal strength range provides mechanical robustness and leak resistance to the package, while allowing easy opening of the package by peeling. Suitably, the seal strength (peel strength) of the region of sealing having a relatively high heat sealing strength as measured by ASTM F88-00 is greater than about 30N, preferably greater than about 50N.

In certain embodiments, the package may contain a foodstuff, such as a shelf-stable ready to eat foodstuff, for example a full moisture foodstuff. Examples include shelf-stable soups, sauces, and/or full moisture starchy foodstuffs such as rice or pasta. In these embodiments the region of relatively weak bonding can be used to provide a pressure release feature, whereby the weakly bonded region breaks open when the internal pressure in the package exceeds a predetermined threshold. This feature permits reheating of the products in a microwave oven with controlled pressure relief.

It is envisaged that the sheet materials according to the present invention will also be especially useful for making individual, disposable, compostable capsules or sachets for beverage making ingredients to be used in beverage dispensing installations. Accordingly, the package according to the second aspect of the present invention may be a beverage making capsule that contains a beverage making ingredient. Suitable ingredients include tea (leaf or instant), coffee (ground or instant), drinking chocolate (powder or concentrate), beverage whitener (solid or liquid), or a soft drink concentrate such as a water soluble or water dispersible syrup or sweetened powder concentrate.

In certain embodiments, the beverage making ingredient is an infusible beverage brewing ingredient, such as leaf tea or ground coffee. In such embodiments the capsule may further comprise a compostable filter sheet inside the capsule and bonded to an internal surface of the capsule. Typically, the amount of ingredient in the package is sufficient for the preparation of one portion of beverage, i.e. from about 25 to about 500 ml, preferably from about 100 ml to about 250 ml. For example, the package may contain from about 2 g to about 12 g of ground coffee or from about 1 g to about 9 g of leaf tea.

It will be appreciated that the moisture and frequently heat introduced into the capsule during preparation of a beverage from the capsule will themselves initiate and accelerate the breakdown of the degradable materials making up the capsule. Typically the beverage making capsule according to this aspect of the invention is at least about 90% composted within 100 days after brewing a beverage from the capsule, as determined by composting in accordance with EN13432.

In certain embodiments, the package according to the present consists essentially of oxygen-impermeable compostable film material, optionally a compostable filter material inside the capsule body, and optionally a compostable injection nozzle.

The package comprises at least one compostable sheet. In certain embodiments, the package comprises two compostable sheets bonded in face to face relationship to provide a flexible sachet. In other embodiments, a sachet is formed by folding-over a single compostable sheet, and bonding the edges of the sheet together to form the edges of the sachet.

In certain embodiments, the package further comprises a nozzle for water injection to pressurize the package. The nozzle may be inserted into a top edge of the sachet. Suitable sachet constructions are as described in EP-A-0179641 or GB-A-2121762, the entire contents of which are incorporated herein by reference. In other embodiments, there is no nozzle, for example if the package is to be internally pressurized by heating, or if the package is to be internally pressurized by injection of water into the package through a hollow injector tube that pierces a side of the package. The nozzle may be made of a compostable polymer, for example a polylactide, which welds entirely to the sealable layer of the sheets, forming leak-free seals.

In certain embodiments a flexible reinforcing strip may be attached to the compostable sheet proximate to the weakly bonded seal to increase the stiffness of the sheet in that region and thereby provide more controlled opening of the package. Suitable reinforcing strips are described in WO99/05036, the entire content of which is incorporated herein by reference.

As discussed above, the bonding between the first and second sheets may be weaker in a first region of the margin than in the remainder of the margin, whereby the capsule body can open by separation of the first and second sheets in the first region when the interior of the capsule body is pressurized.

In a third aspect, the present invention provides a method of manufacture of an environmentally friendly package comprising the step of providing a compostable sheet material according to the present invention, and sealing an area of said sheet material to form said package, wherein the step of sealing is carried out at a first temperature in a first region of said area and at a second temperature different from said first temperature in a second region of said area, whereby the peel strength (sealing strength) of the resulting seal is different in said first and second regions.

Suitably, the first sealing temperature is at least about 5° C. greater than the second temperature, for example from about 10° C. to about 100° C. greater, typically about 20° C. to about 60° C. greater. Suitably, the first sealing temperature is in the range of from about 100° C. to about 250° C., for example from about 170° C. to about 200° C. Suitably, the second temperature is in the range of from about 60° C. to about 150° C., for example from about 80° C. to about 120° C.

Preferably, the method is adapted for the production of a package according to the second aspect of the invention.

Certain embodiments of the method of the invention comprise the steps of: placing two webs of the compostable sheet material in face-to-face relation; and bonding the webs together around a margin to form a capsule body. In these embodiments, the method may further include bonding the webs to a water injection nozzle as described above. The nozzle may be made of a compostable polymer, for example a polylactide, which welds entirely to the sealable layer of the sheets, forming leak-free seals.

BRIEF DESCRIPTION OF THE DRAWINGS

Certain embodiments of the present invention will now be described further, by way of example, with reference to the accompanying drawings, in which.

DETAILED DESCRIPTION OF THE INVENTION

Figure 1:
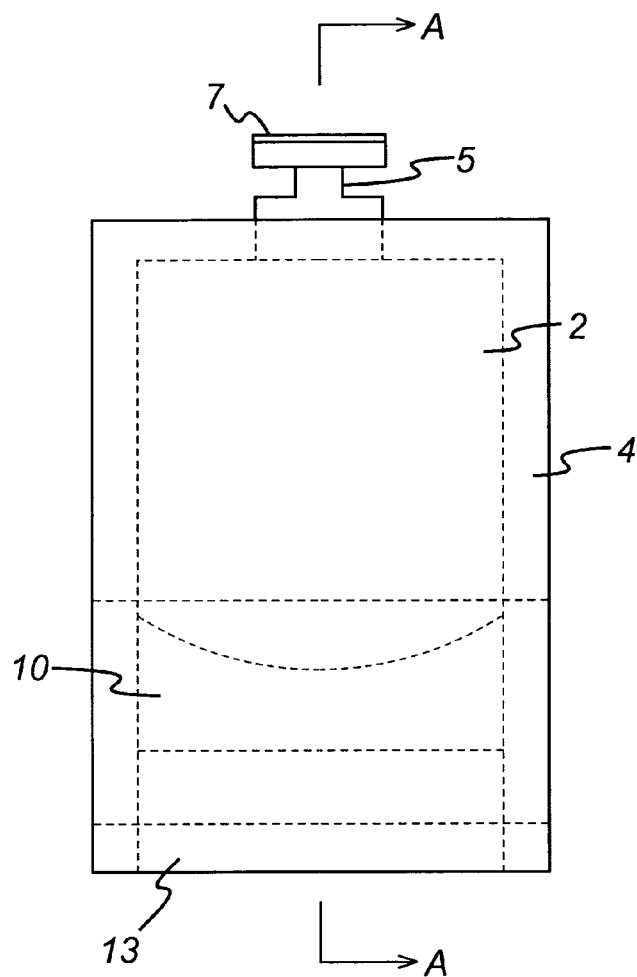
FIG. 1 shows a plan view of a first sealed package according to the present invention.
Figure 2:
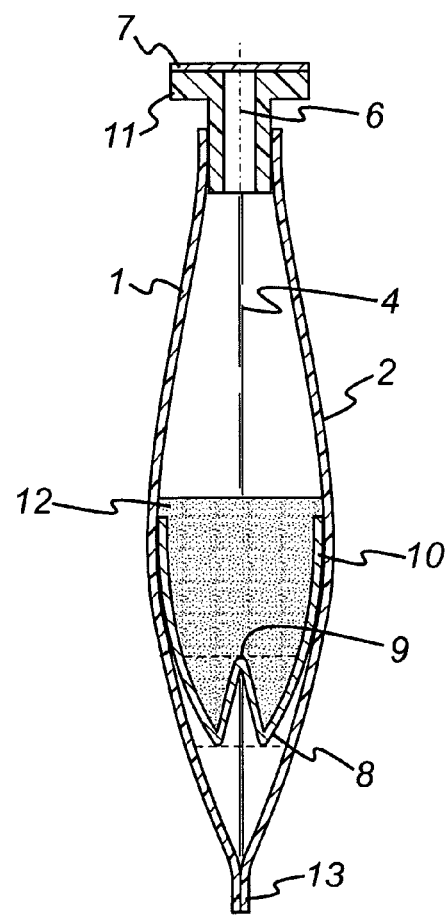
FIG. 2 shows a sectional view along A-A of the inventive package of FIG. 1.
Figure 3:
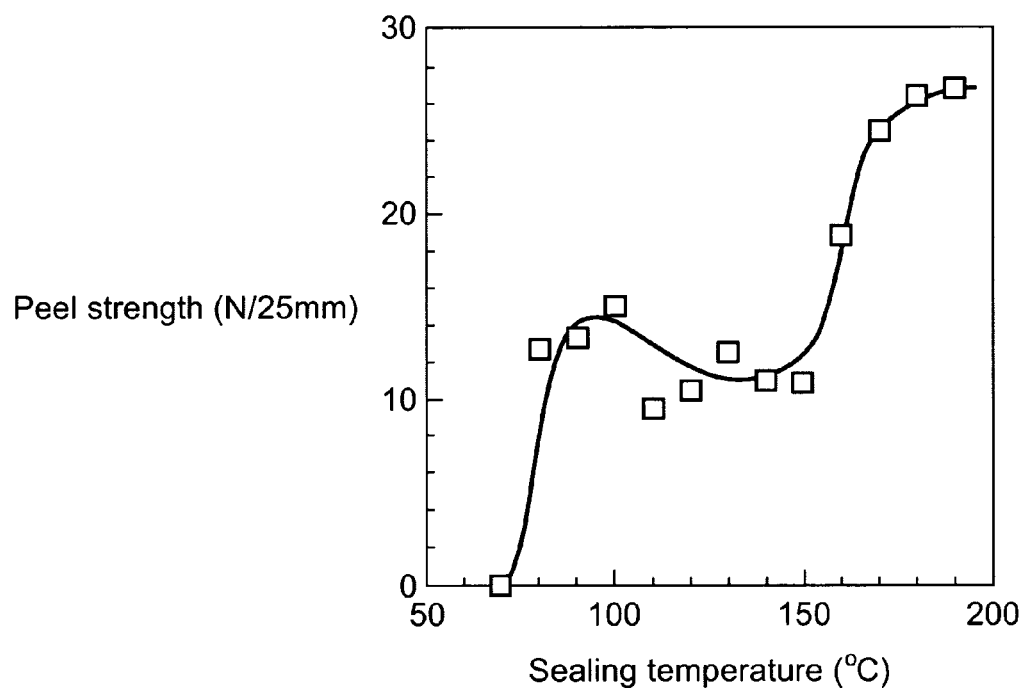
FIG. 3 shows a graph of sealing strength against sealing temperature for a sheet material according to the present invention.
Figure 4:
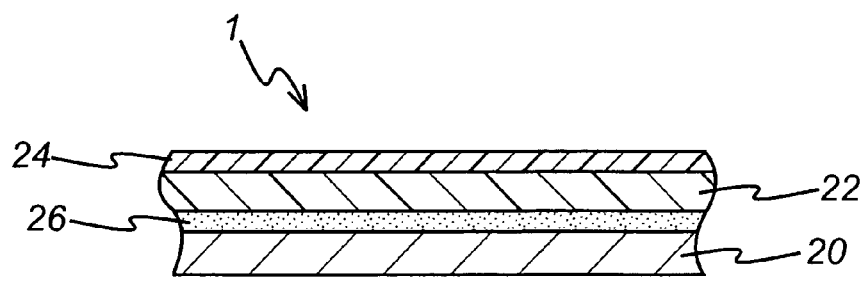
FIG. 4 shows a cross sectional view through a portion of a compostable film according to the present invention.

Referring to FIGS. 1 and 2, the package according to the invention is generally similar to the sachet described in EP-A-0179641. It comprises two compostable laminate sheets 1,2. As shown in FIG. 4, each laminate sheet comprises an outer layer 20 of paper (Kraft 40 g/m$^2$) an inner multilayer sealing film. The sealing film is a PLA laminate available from Hoechst Trespaphan GmbH under the Registered Trade Mark Biophan PLA 121 and has total thickness 30 micrometers. The sealing film comprises a core 22 of relatively high-melting-point, relatively crystalline PLLA and a surface layer 24 of relatively lower melting point, relatively amorphous PLA containing a higher proportion of the D-lactate stereoisomer. The sealing film is laminated to the paper by means of a compostable adhesive 26, such as a polylactate adhesive.

The front and back sheets 1,2 are bonded together along edge seams 4. A nozzle 5 is inserted into the top seam of the sachet. A flange 11 on the nozzle enables the sachet to be gripped by a clamp.

Within the sachet there is a W-shaped sheet 8 of compostable filter material of polylactide spun-bonded fibers that is thermally bonded to the front and back faces of the sachet on each side over an area 10 as shown. The filter 8 is provided with a centre fold 9 whose apex points upwardly as shown in FIG. 2. The filter 8 supports a quantity of ground coffee 12. In use, the filter 8 is everted as described in more detail in EP-A-0179641.

The edge seams 4 and top seam of the sachet are bonded together with high sealing strength using temperatures in excess of the crystalline melting point of the PLLA film (i.e. >160° C.). The bottom seam 13 of the sachet is bonded with a relatively low sealing strength using temperatures of about 100° C. to about 150° C., i.e. above the softening point of the amorphous sealing layer, but below the crystalline melting point. Nevertheless, the sachet provides an oxygen and moisture-impermeable enclosure for the coffee until the sachet is used.

In use, the sachets are inserted into a suitable beverage brewing machine, where they are gripped by a clamp (not shown) under the nozzle flange. A hollow needle is inserted into the nozzle, and hot water is injected at a pressure of approximately 0.5 bar gauge to brew coffee inside the sachets. The pressure of the hot water causes the weakly bonded margin 13 at the bottom of the sachets to peel apart, releasing the resulting coffee in a controlled fashion.

Test Methods

The heat seal strength of the sheet materials was measured using a test method which measures the force required to separate a seal after the material has cooled to 23° C. temperature. The film samples were exposed to a relative humidity of 50 percent and a temperature of 23° C. for a minimum of 24 hours prior to testing.

Heat sealing was carried out according to the following conditions:

Specimen Width: 25 mm
Sealing Time: 2 seconds
Sealing Pressure: 3 bar
Temperature Range: 70° C.-190° C.

The seal strength of the film samples was determined using an Instron Tensile Tester. The results are shown in FIG. 1. It can be seen that a first sealing strength plateau is reached in the sealing temperature range about 90° C. to about 150° C., and a second, higher sealing strength is achieved in the sealing temperature range about 170° C. to about 190° C.

The above embodiments have been described by way of example only. Many other embodiments falling within the scope of the accompanying claims will be apparent to the skilled reader.

What is claimed is:

1. A method of manufacture of an environmentally friendly beverage preparation package comprising the steps of:
    providing a single compostable sheet material comprising an outer compostable outer substrate layer having an inner side that includes a first sealable layer on the inner side of the substrate layer and a second sealable layer overlaying the first sealable layer, wherein the first and second sealable layers provide a core of a high-melting-point and a surface layer of a lower melting point, the sheet material having a top, bottom and side edges;
    placing two webs of the compostable sheet material together with the second sealable layers in a face-to-face relationship;
    inserting a nozzle between the top edges of the sheet material wherein the nozzle is configured for injecting liquid into the package interior and pressurizing the beverage preparation package;
    forming the beverage preparation package by sealing the top, bottom and side edges of the sheet material together to form seams in which the nozzle is sealed between the two sheets of compostable material and the top and side edges are bonded together with a high sealing strength using temperatures higher than 160° C. and the bottom seams are bonded with a low sealing strength using temperatures of about 100° C. to 150° C.;
    wherein the bottom seams, bonded with a low sealing strength, allow for separation of the sheets when the interior of the beverage preparation package is pressurized.

2. The method of manufacture according to claim 1, wherein the peel strength of the region of sealing having the low heat sealing strength is in the range of 2N to 30N.

3. The method of manufacture according to claim 1, wherein the peel strength of the region of sealing having the higher sealing strength is greater than 30N.

4. A method of manufacture of an environmentally friendly beverage preparation package comprising the steps of:
    providing a single compostable sheet material comprising an outer compostable outer substrate layer having an inner side that includes a first sealable layer on the inner side of the substrate layer and a second sealable layer overlaying the first sealable layer, wherein the first and second sealable layers provide a core of a high-melting-point and a surface layer of a lower melting point, the sheet material having a top, bottom and side edges;

folding over the single compostable sheet material so that the second sealable layer is in a face-to-face relationship prior to sealing the edges;

inserting a nozzle between the top edges of the sheet material wherein the nozzle is configured for injecting liquid into the package interior and pressurizing the beverage preparation package;

forming the beverage preparation package by sealing the top, bottom and side edges of the sheet material together to form seams in which the nozzle is sealed between the two edges of the sheet material and the top and side edges are bonded together with a high sealing strength using temperatures higher than 160° C. and the bottom seams are bonded with a low sealing strength using temperatures of about 100° C. to 150° C.;

wherein the bottom seams, bonded with a low sealing strength, allow for separation of the sheets when the interior of the beverage preparation package is pressurized.

5. An environmentally friendly beverage preparation package manufactured with a method comprising the steps of:

providing a single compostable sheet material comprising an outer compostable outer substrate layer having an inner side that includes a first sealable layer on the inner side of the substrate layer and a second sealable layer overlapping the first sealable layer, wherein the first and second sealable layers provide a core of a high-melting-point and a surface layer of a lower melting point, the sheet material having a top, bottom and side edges;

placing two webs of the compostable sheet material together with the second sealable layers in a face-to-face relationship;

inserting a nozzle between the top edges of the sheet material wherein the nozzle is configured for injecting liquid into the package interior and pressurizing the beverage preparation package;

forming the beverage preparation package by sealing the top, bottom and side edges of the sheet material together to form seams in which the nozzle is sealed between the two sheets of the compostable material and the top and side edges are bonded together with a high sealing strength using temperatures higher than 160° C. and the bottom seams are bonded with a low sealing strength using temperatures of about 100° C. to 150° C.;

the bottom seams, bonded with a low sealing strength, allow for separation of the sheets when the interior of the beverage preparation package is pressurized;

wherein an environmentally friendly beverage preparation package is manufactured.

* * * * *